United States Patent [19]
Drexler et al.

[11] Patent Number: 5,608,628
[45] Date of Patent: Mar. 4, 1997

[54] PROCESS AND APPARATUS FOR DETECTING VEHICLE IMPACT

[75] Inventors: Johannes Drexler, Dasing; Alfons Wöhrl, Schrobenhausen; Heinz Bader, Karshuld; Andreas Bernitt, Schrobenhausen; Hans Spies, Pfaffenhofen; Günter Fendt; Peter Hora, both of Schrobenhausen, all of Germany

[73] Assignee: Messerschmitt-Bölkow-Blohm GmbH, Germany

[21] Appl. No.: 284,990

[22] Filed: Aug. 4, 1994

Related U.S. Application Data

[63] Continuation of Ser. No. 891,042, Jun. 1, 1992, abandoned.

[30] Foreign Application Priority Data

May 31, 1991 [DE] Germany ............... 41 17 811.4

[51] Int. Cl.⁶ .................. B60R 21/32; B60R 21/08
[52] U.S. Cl. .................. 364/424.055; 340/669; 307/10.1; 280/734; 180/282
[58] Field of Search .......... 364/424.05; 340/436, 340/438, 669; 280/735, 734; 180/274, 282; 307/10.1

[56] References Cited

U.S. PATENT DOCUMENTS

| | | | |
|---|---|---|---|
| 4,497,025 | 1/1985 | Hannoyer | 364/424.05 |
| 5,122,954 | 6/1992 | Okano | 364/424.05 |
| 5,157,268 | 10/1992 | Spies et al. | 307/10.1 |
| 5,173,614 | 12/1992 | Woehrl | 307/10.1 |
| 5,182,459 | 1/1993 | Okano et al. | 307/10.1 |
| 5,225,985 | 7/1993 | Okano | 364/424.05 |
| 5,317,512 | 5/1994 | Ota et al. | 364/424.05 |
| 5,339,242 | 8/1994 | Reid et al. | 364/424.05 |

*Primary Examiner*—Kevin J. Teska
*Assistant Examiner*—Tyrone V. Walker
*Attorney, Agent, or Firm*—Evenson, McKeown, Edwards & Lenahan P.L.L.C.

[57] ABSTRACT

A method and apparatus for recognizing a crash, in a vehicle by measuring vehicle speed change continuously within a limited time periods and comparing the measured values with those determined in prior time periods. Acceleration can be differentiated out by means of the above-mentioned process/arrangement and can be evaluated if, in the case of a high-speed and low-speed crash, it should not be possible to differentiate sufficiently by means of the partial speed difference. Different partial speed differences (by means of observation periods of different durations) can be measured and compared in order to permit ignition in the case of slower (oblique) crashes only within a limited time window in the initial phase of the crash.

3 Claims, 6 Drawing Sheets

PROCESS AND APPARATUS FOR DETECTING VEHICLE IMPACT

This application is a continuation of application Ser. No. 07/891,042, filed on Jun. 1, 1992, now abandoned.

This invention relates to a method and apparatus for detecting an impact in the case of vehicles, particularly motor vehicles.

In known methods and circuit arrangements for recognizing and evaluating impacts in vehicles with occupant restraint systems, the evaluation is performed essentially by integration or multiple integration of measured acceleration values until predetermined thresholds are reached. The threshold values are usually determined empirically, and have the purpose of differentiating, for example, between a front impact on the one hand, and a side impact, a ram from behind, the blow of a hammer, driving along rough roads or a contact with the curb on the other. In other words, such an arrangement is capable of discriminating the most dangerous collisions—frontal impact at an angle of up to approximately 45° with respect to the driving direction. Such a device is described, for example, in the German Patent Document DE-OS 38 16 587 of the applicant.

It is an object of the present invention to provide a device which offers a high degree of reliability in discriminating types of impacts, uses a simple algorithm which can be performed in a microcomputer or microcontroller, and permits arbitrary adjustment, particularly an increase, of the threshold values.

This and other objects and advantages are achieved according to the invention, which is based on the principle that an impact is first recognized by detection of a reduction in vehicle speed by an amount equal to a first predetermined threshold, which is slightly below a second predetermined triggering threshold. As a result, a high reliability is achieved against influencing of the process by extraneous inputs such as the driving operation (rough road, contact with curb, etc.) or abuse (blow of a hammer, etc.). The process then evaluates whether the reduction of the vehicle speed in the initial phase takes place rapidly (corresponding to a frontal impact) or whether the reduction of the vehicle speed takes place over a longer period of time (corresponding to an oblique impact). If one of these two criteria is met with sufficient intensity, the triggering of a vehicle restraint system takes place.

The differentiation between a frontal impact and an oblique impact by means of the detection methods and apparatus according to the invention permits a simple adaptation of the process to the required triggering threshold. Thus, after detection of an impact, the relevant triggering parameters are changed as a function of the rise in acceleration immediately before the impact recognition. In this manner, the sensitivity of the device in discriminating front and oblique impacts can be enhanced, as described hereinafter.

Detection of the impact intensity according to the invention is performed by evaluation of a so-called "partial speed difference" $\Delta v$ according to FIG. 2a. The partial speed difference is the difference between the instantaneous vehicle speed $v(t)$ and the vehicle speed $v(t-\Delta tp)$ at the point in time $t-\Delta tp$; that $$\Delta v = v(t) - v(t-\Delta tp)$$

The signal $\Delta v$ is therefore a measurement of the change in vehicle speed within the time period $\Delta tp$.

According to the basic principle of the invention, the process can be divided into the functions: impact recognition, oblique-impact recognition, and frontal-impact recognition. An impact is recognized when a partial speed difference $vp1$ (formed over the time $\Delta tp1$) exceeds a predetermined threshold $S1$, so that oblique-impact and frontal-impact criterion can become operative.

A frontal impact exists when the signal $vp1$ exceeds a threshold $S2$ ($S2>S1$) and at the same time the changed vehicle speed is $v=vp1$. An oblique impact, on the other hand, is recognized when the signal $vp1$ exceeds a threshold $S3$ ($S3>S2$) within a time period $td$, measured from the point in time of impact recognition.

After recognition of an impact, the triggering thresholds $S2$ and $S3$ are adjusted as a function of the rise of acceleration just before the recognition of the impact. The detection of the acceleration rise takes place by the formation of a partial acceleration difference $ap$ within the time period $tap$ (principle of FIG. 2). The change of thresholds $S2$ and $S3$ takes place by the comparison of signal $ap$ with a threshold $aS$. When the signal $ap$ exceeds a value $aS+daS$, the thresholds $S2$ and $S3$ are reduced by an amount $dS2-$ and $dS3-$ respectively. Correspondingly, the thresholds $S2$ and $S3$ are increased by an amount $dS2+$ and $dS3+$ respectively when $ap$ falls below the value $aS-daS$. When an acceleration difference $ap$ occurs between the values $aS-daS$ and $aS+daS$, the thresholds $S2$ and $S3$ remain unchanged.

The adaptation of the process to the required triggering threshold takes place in essentially four steps:

Selection of $tp1$ and $S2$ so that, in the case of the slowest 0°-impact, a triggering still takes place by way of the "frontal impact" criterion;

Selection of $S3$ and $td$ so that, in the case of the slowest 30°-impact, a triggering takes place by way of the "oblique impact" criterion;

Selection of $S1$ so that, in the case of the slowest permissible 0°- or 30°-impact, this impact is reliably recognized; and Selection of $aS$ so that, in the case of the slow impact, there is a falling-below $aS$, and in the case of the fast impact $aS$ is exceeded. (The foregoing angles are expressed relative to the longitudinal center axis of the vehicle.)

Other objects, advantages and novel features of the present invention will become apparent from the following detailed description of the invention when considered in conjunction with the accompanying drawings.

DETAILED DESCRIPTION OF THE DRAWINGS

Figure 1:
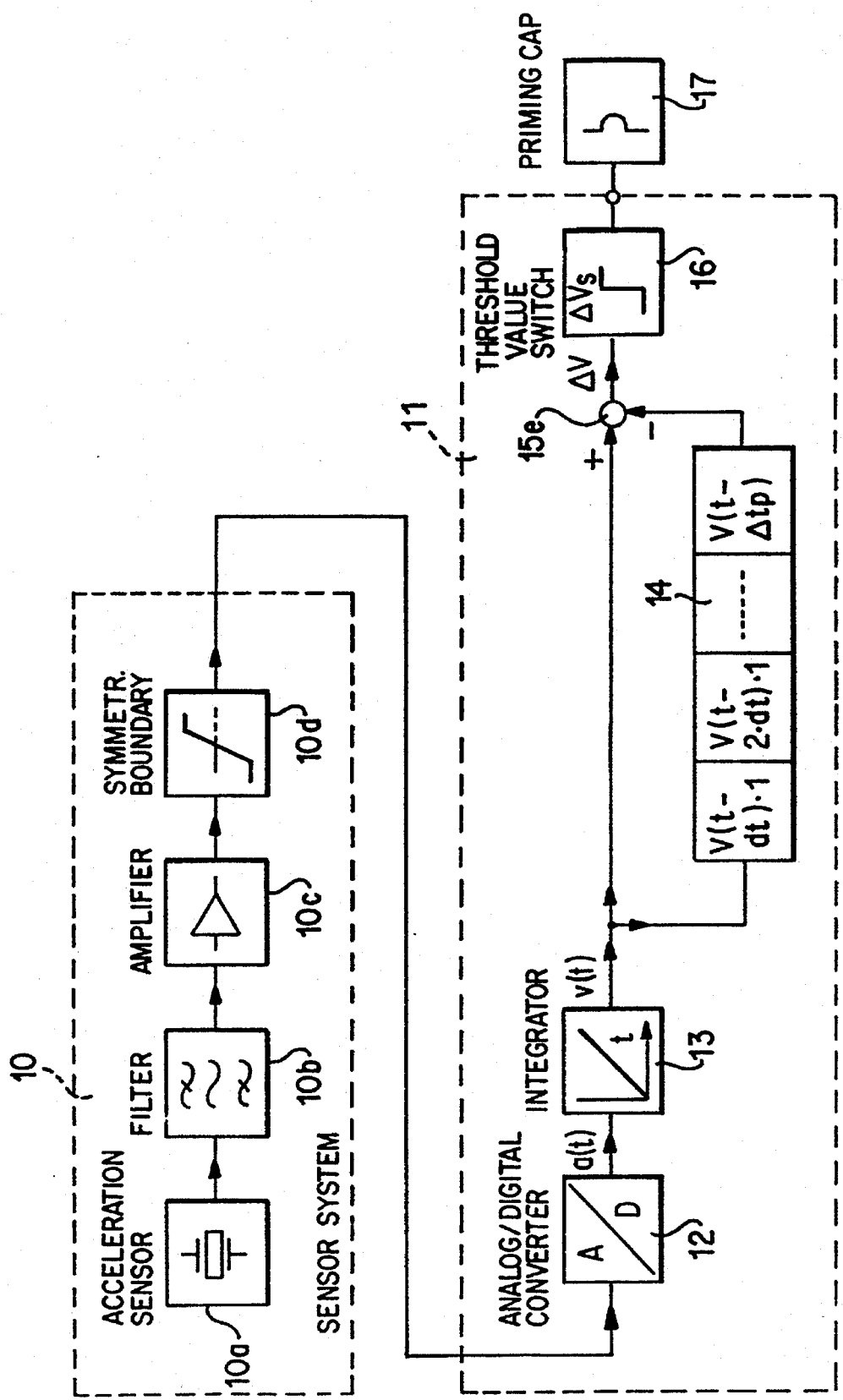
FIG. 1 is a schematic diagram which illustrates the process for generating partial speed difference signals utilized by the impact detection method and apparatus according to the invention.

Referring the drawing, the process for derivation of partial speed differences utilized by the impact detection apparatus according to the invention is illustrated in FIG. 1, in which the reference numeral 10 designates an acceleration detection module. The output from acceleration sensor 10a is smoothed in filter 10b and amplified in amplifier 10c. The output from amplifier 10c is fed in turn to a symmetrical limiting device 10d, and thence to measuring module 11. The analog acceleration signal is digitized in A–D converter 12 and integrated in integrator 13 to generate a digital signal equal to the instantaneous velocity of the vehicle v(t), which is fed to the input of a first in-first out buffer memory device 14. The output from buffer memory 14, which is delayed by a predetermined time period Δtp, is then summed with the output from integrator 13 to generate a partial speed difference signal Δv, which is fed to a threshold value detector 16, the output of which is used to activate a triggering device, such as a vehicle air bag.

For the purpose of clarity, the partial speed difference in FIG. 1 is derived by integrating the output signal directly from the acceleration detector 10. In practice, however, in such an arrangement, a certain amount of drift must be expected in the resulting vehicle speed signal due to offset errors and the like. Thus, additional stabilizing measures may be necessary to maintain the system's accuracy.

Figure 2:
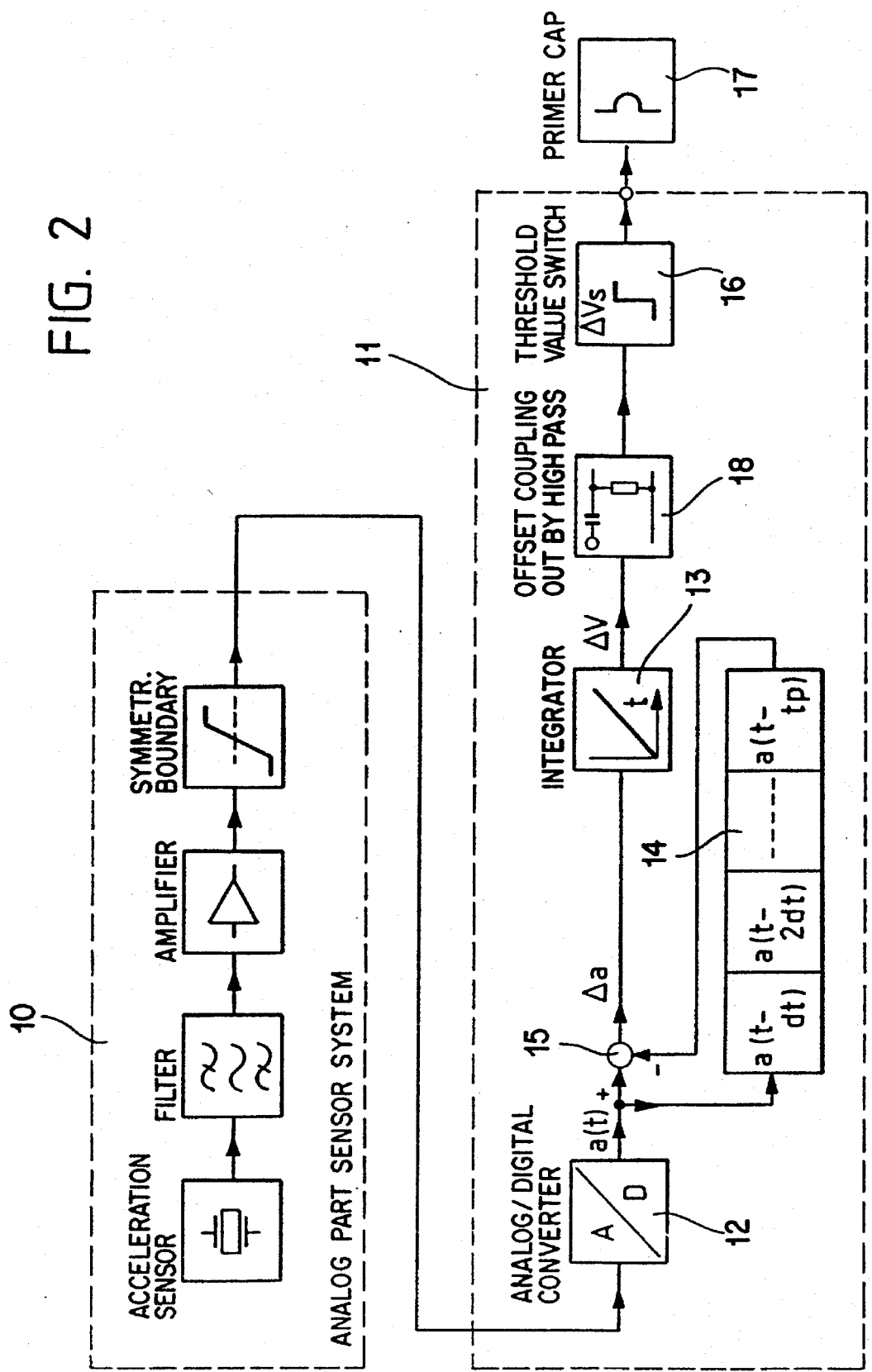
FIG. 2 illustrates an alternative process for generating partial speed differences utilized by the invention.
Figure 2A:
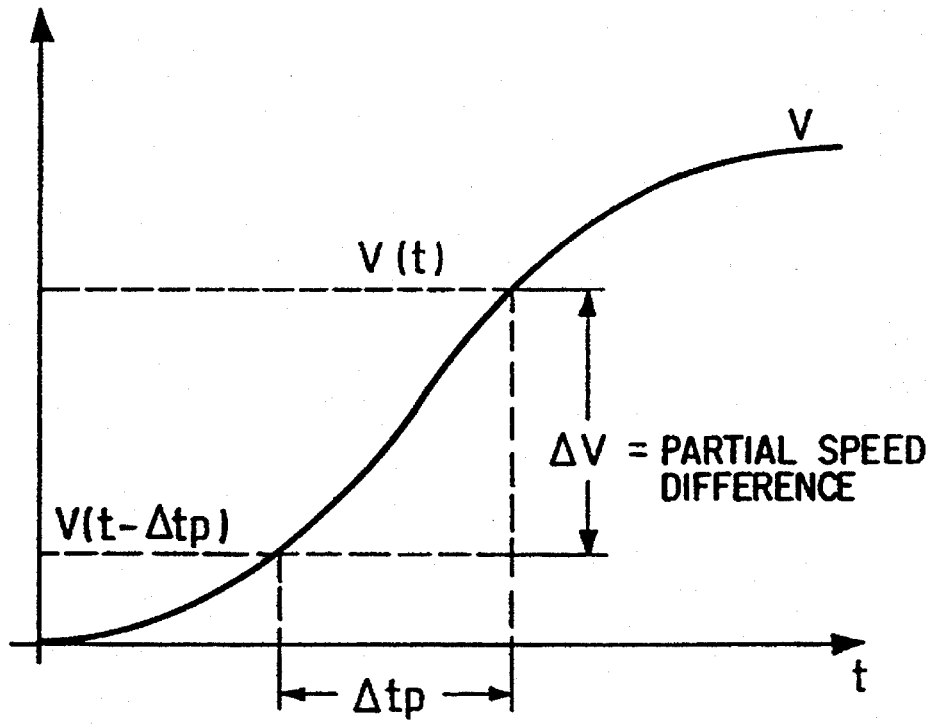
FIG. 2A is a graphic depiction of the derivation of a partial speed difference according to the invention.

FIG. 2 illustrates how a partial speed difference can also be formed by integration of a partial acceleration difference Δa $$\Delta a = a(t) - a(t - \Delta tp).$$

An overflow of the integrator 13 in FIG. 2 is prevented by the fact that Δv is stored only after passing through a high-pass filter 18. The integration result therefore exists only as a temporary intermediate value. Another advantage of this embodiment is apparent when it is considered that the acceleration a is expressed as a 1-byte value, whereas a resolution of 2-bytes is required for the speed.

For generating signals vp1, vp2 and ap, only a single memory is required, the capacity of which must correspond to the longest deceleration time, in this case tp2.

For the frontal-impact criterion, a comparison is required between the reduced vehicle speed v and the signal vp1. However, when it is taken into account that a signal vp formed of v over the time tp within a time period 0<t<tp is identical with the signal v, the speed signal v can be replaced by a signal vp with a correspondingly long time tp.

In the present case, tp2 is correspondingly large so that v=vp2 can be set.

Figure 3:
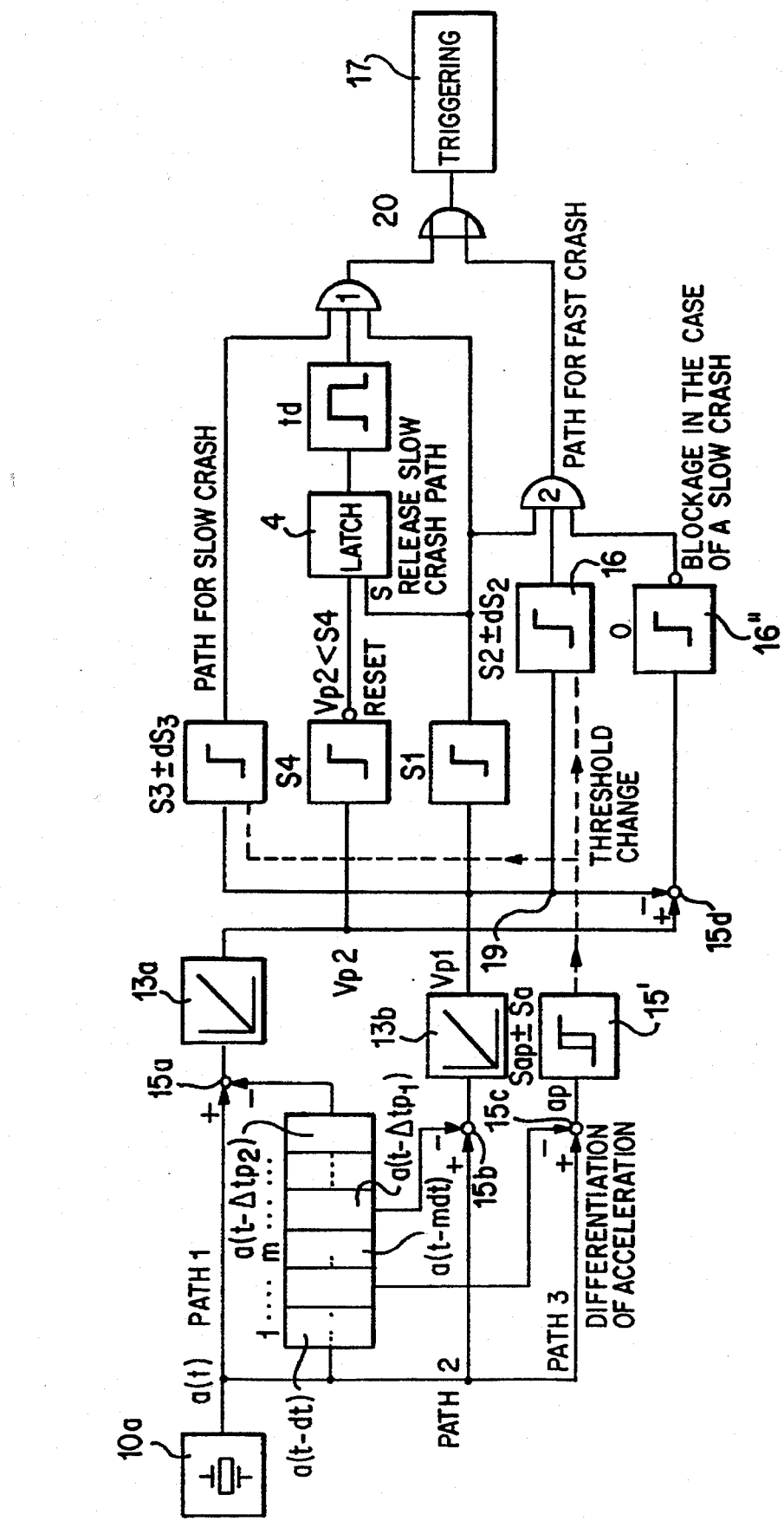
FIG. 3 is a schematic diagram of a preferred embodiment of the invention.

A preferred embodiment of the invention is illustrated in FIG. 3. The acceleration sensor 10a, for example a piezoelectric sensor, detects acceleration (in this case, negative) a(t). The output of sensor 10a is fed to a first in-first out buffer memory device 1 ... m ... , where it is stored sequentially so that time delayed values can be outputted to summation points 15a–c. The measured signal is also split into three paths: a first path leads to a summation point 15a and to a first integrator 13a; a second or median path, like the first path, leads to a summation point 15b and then to an integrator 13b, the latter for obtaining vp1, and the former for obtaining vp2. The third partial path of the measured signal from sensor 10a leads by way of the summation point 15c, to a differentiator 15'. Advantageously, the latter module is connected with a threshold detector 16' for S2±dS2 for a threshold change.

As noted previously, an impact is recognized when the partial speed difference Vp1 exceeds a first predetermined threshold. For this purpose, the output signal Vp1 from integrator 13b is fed via junction 19 to the threshold detector S1. The output of S1 in turn is connected to both of the AND gates 1 and 2, representing the "slow" and "fast" crash paths, respectively. At the same time, the output of S1 is also provided to the set input of latch 4, so that it is set at the point in time of impact recognition, which releases and gate 1 for the time td by way of a monostable multivibrator, thus enabling the release of a signal via the "slow" crash path.

In the center part of the block diagram (FIG. 3), it can be seen that the measured signal in path 1 is fed via the first summation point 15a and the first integrator 13a to the junction vp2, and thence to another summation point 15d which, in turn, is connected with a blocking member 16", which blocks an element 2 (and hence the "fast" crash path of the circuit) in the case of a slow crash. The junction vp2 is also connected with a threshold value detector S4, which provides a reset signal at its output when vp2<S4, indicating the end of the impact. Thus, the latch 4 is reset when Vp2 (formed over tp2, which is greater than tp1) falls below threshold S4.

In addition, junction 19 is connected with threshold value detector S3±dS3 which, in turn, by way of a path for a slow crash, is connected with the AND-element 1 on top in FIG. 3. On the other side, the junction 19 is connected with a threshold value switch S2±dS2, which in turn is connected directly with an AND-element 2, which connects a path for a fast crash with an OR-element 20 and the triggering element 17, such as the primer cap of an air bag or of another restraint system.

As shown at the right in FIG. 3, the upper three paths are used for the linking with and element 1, and the lower three paths are used for the linking with and element 2 because the latter is connected with the OR-element 20. (The output of threshold detector S1 is common to both.) The lower most path is used only for the blocking in the case of a slow crash by means of the blocking element 16" set to a predetermined threshold value and, in turn connected with the summation point 15d, which can be fed from the first and the second integrators 13a and 13b. The optional threshold change can take place by means of element as+daS at elements S2+dS2 and S3+dS3.

A refinement of the process described above differentiates between high-speed crashes (for example, ≧35 km/h) and low-speed crashes (for example, ≦23 km/h). In this arrangement, during the initial phase, within the maximally permissible triggering time (or non-triggering time), almost the same large partial speed difference occurs because of the fact that the acceleration a according to FIG. 3 is differentiated and by means of this value, threshold value changes are carried out for such thresholds which, when they exceed the partial speed vp1, initiate the triggering.

Figure 4:
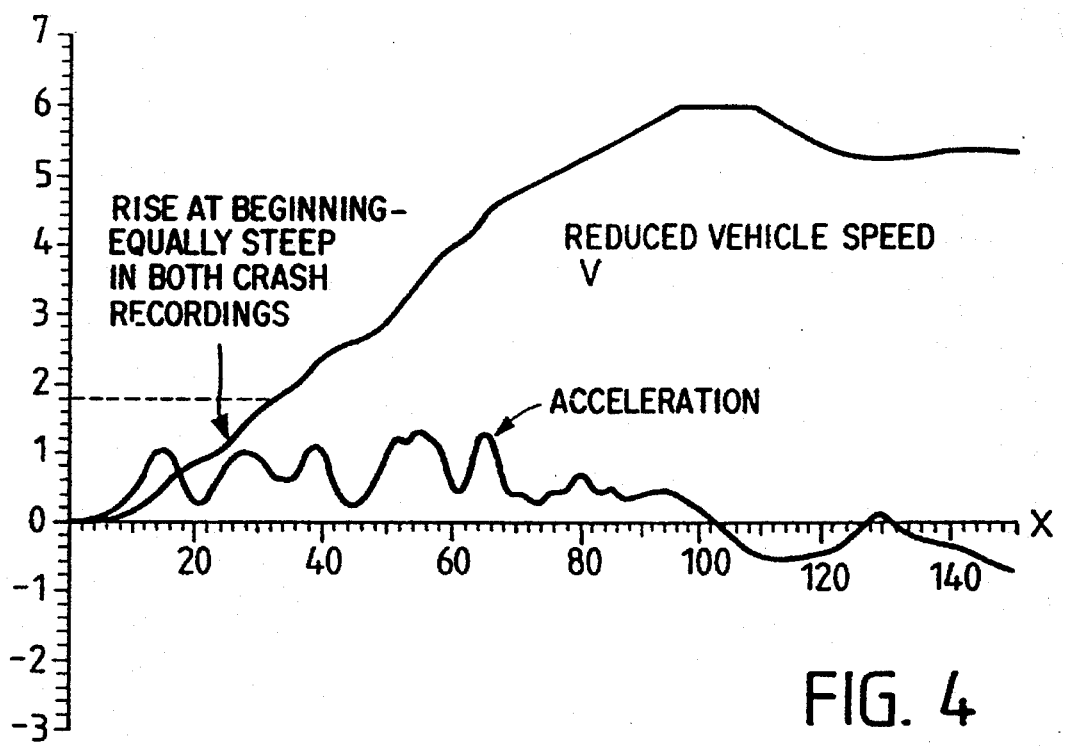
FIGS. 4–7 are graphic depictions of representative speed and deceleration recorded during impacts under various conditions.

According to experience, in the case of high-speed crashes (FIG. 5), the transient fluctuations of the acceleration signal is more pronounced than in the case of low-speed crashes (FIG. 4).

Figure 5:
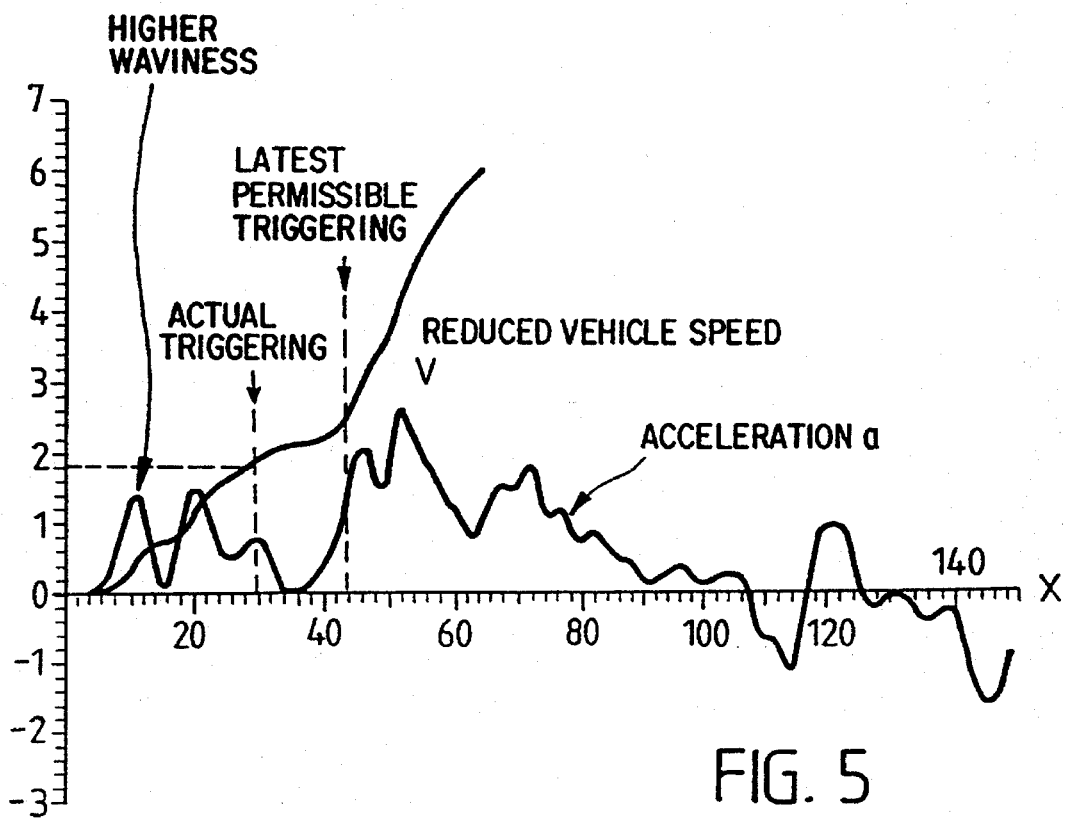

In FIGS. 4 and 5, such impact cases and their possible evaluation are shown as examples. In FIG. 4, the upper curve denotes reduced vehicle speed, and the lower one denotes the acceleration. The curve for reduced vehicle speed v in FIG. 4 and FIG. 5 is at first approximately equal with respect to the rise time, and changes only later. As indicated by the comparison between FIG. 4 and FIG. 5, the curve for the acceleration a in FIG. 5 was measured with higher amplitude transient fluctuations. In FIG. 5, a desired value is entered as the latest permissible triggering time, and an actual time is indicated considerably below it as the actual triggering time. In this case, the x-axis indicates time, and the y-axis indicates speed or acceleration, latter being expressed in 10 g (1 g=acceleration due to gravity=9.81 m/$_{sec}$2).

Another modification of the method and apparatus according to the invention differentiates slow (oblique) (FIG. 7) and fast (frontal) crashes (FIG. 6) in that a partial speed difference vp1 is compared with a partial speed difference similar to the reduced vehicle speed (achieved by a very long Δtp2.

In a fast crash, the partial speed vp1 in the initial phase is the same as the reduced vehicle speed. Triggering in the case of the fast crash takes place by way of a path with the lower triggering threshold S2 than in the case of the slow crash with the higher triggering threshold S3 (S2<S3).

In a slow crash, the partial speed difference vp1, after the end of Δtp1 is lower than the reduced vehicle speed (~vp2). In this case, the path for the fast crash evaluation must be blocked. The threshold S3 for the evaluation of the slow crash is therefore set to be higher than the fast-crash threshold S2 so that a good differentiation is possible from the low-speed crash (non-triggering).

In the case of the slow crash, triggering can be permitted only within a limited time period td after the recognition of a start of the crash by means of threshold S1 (S1<S2), because otherwise the vehicle occupant, who has already shifted forward considerably, is thrown back onto the seat by the inflating air bag, or the head is pressed into the neck by the air bag.

Figure 6:
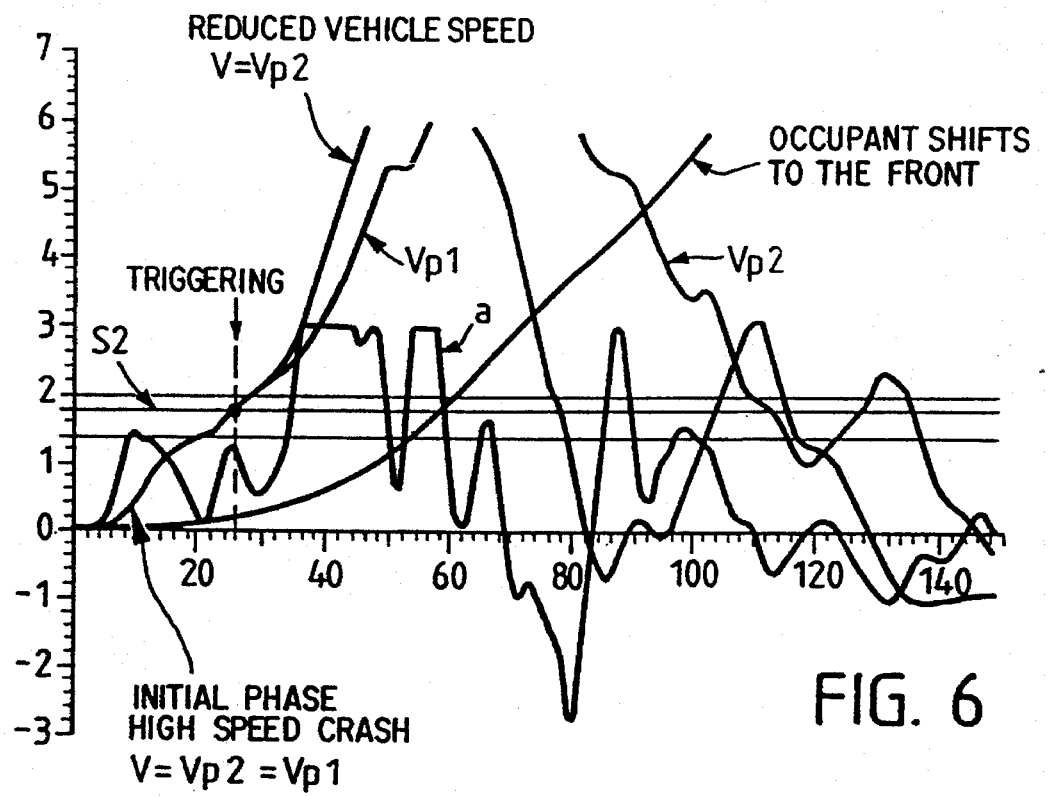
Figure 7:
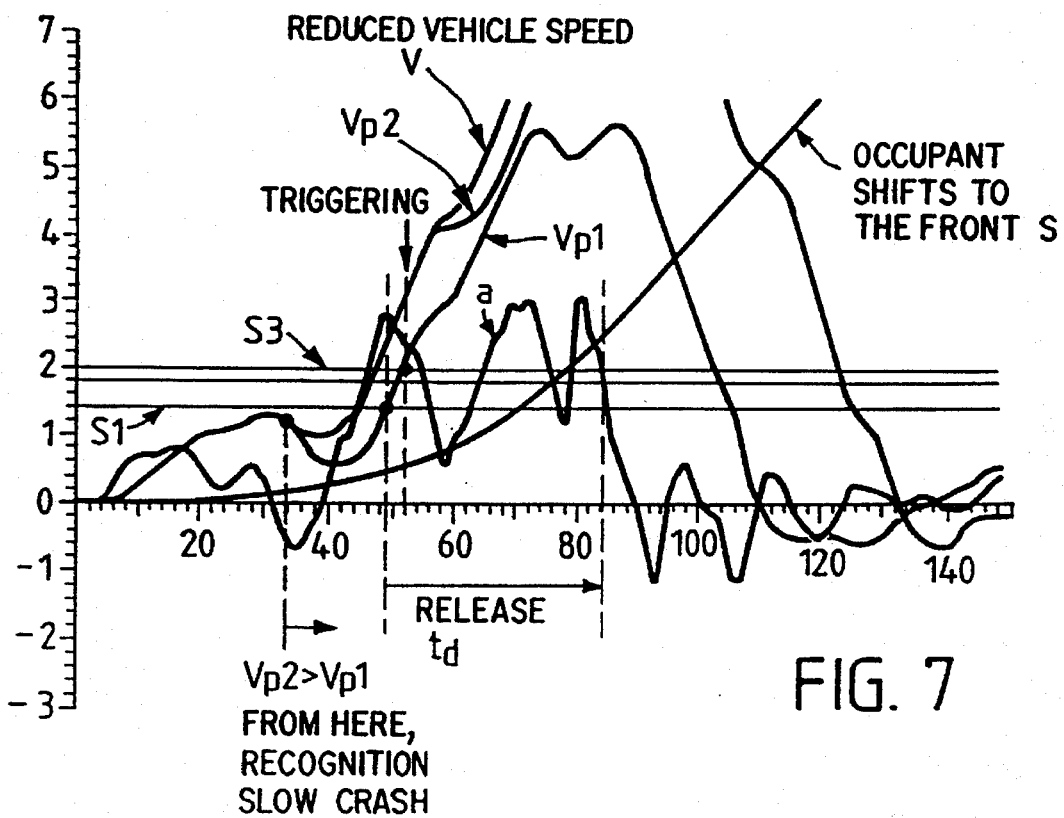

The recorded curves of FIGS. 6 and 7 correspond to actual tests. The system of coordinates and the dimension data used as examples are expressed in the same IS-system as in FIGS. 4 and 5. The advantages of the use of the sliding threshold process according to the invention are particularly clear in these cases.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Process for detecting an impact of a motor vehicle equipped with an occupant restraint system having a triggering circuit which activates a primer of said restraint system only after a predetermined impact has been detected, said process comprising the steps of:

measuring positive and negative acceleration of said motor vehicle during a succession of predetermined equal time intervals to determine an acceleration value for each of said time intervals;

storing said acceleration values for each of said predetermined equal time intervals in a computer memory;

determining first and second difference acceleration values for each of said predetermined equal time intervals, said first and second difference acceleration values being equal to a difference between an acceleration value determined for a current time interval and acceleration values determined for respective first and second prior time intervals which precede said current time interval by respective first and second delay periods;

integrating said first and second difference acceleration values to determine first and second difference speed values for each said time interval;

comparing said first difference speed value with a first threshold value to detect a vehicle impact;

comparing said first difference speed value with at least a second threshold value to distinguish between fast and slow impact; and upon detection of a vehicle impact, activating said triggering circuit based on said first difference speed value, said second difference speed value and a result of said comparing of said first speed difference value with said at least a second threshold value.

2. Apparatus for detecting an impact of a motor vehicle equipped with an occupant restraint system having a triggering circuit which activates a primer of said restraint system only after a predetermined impact has been detected, said apparatus comprising:

at least one acceleration sensor for measuring positive and negative acceleration of said motor vehicle during a succession of predetermined equal time intervals to determine an acceleration value for each of said time intervals;

a computer memory for storing said acceleration values for each of said predetermined equal time intervals;

means for determining first and second difference acceleration values for each said predetermined equal time interval, said first and second difference acceleration values being equal to a difference between an acceleration value determined for a current time interval and acceleration values determined for respective first and second prior time intervals which precede said current time interval by respective first and second delay periods;

means for integrating said first and second difference acceleration values to determine first and second difference speed values for each said time interval;

means for comparing said first difference speed value with a first threshold value to detect a vehicle impacts;

means for comparing said first difference speed value with at least a second threshold value to distinguish between fast and slow impact; and means operative upon detection of a vehicle impact, for activating said triggering circuit based on said first difference speed value, said second difference speed value and a result of said comparing of said first speed difference value with said at least a second threshold value.

3. Apparatus for detecting an impact of a vehicle for triggering an occupant restraint system, said apparatus comprising:

an acceleration sensor which provides an acceleration signal indicative of positive or negative acceleration of said vehicle;

a memory for storing said acceleration signals for at least a first relatively shorter delay period and a second relatively longer delay period, to generate at least first and second delayed acceleration signals;

means for subtracting said at least first and second delayed acceleration signals respectively from said acceleration signal and for integrating results of said subtraction, to generate at least first and second partial speed difference signals;

means for comparing said first partial speed difference signal with a first threshold value, to detect a vehicle impact;

means for comparing said first partial speed difference with a second threshold value to detect a slow impact;

means for comparing said first partial speed difference with a third threshold value to detect a fast impact;

means for comparing said second partial speed difference with a fourth threshold value to detect an ending of an impact, and for disabling detection of a slow impact in response thereto;

means for subtracting said first partial speed difference signal from said second partial speed difference signal; and means for comparing difference between said first and second partial speed difference signals with a fifth threshold value, and for disabling detection of a fast impact when said difference exceeds said fourth threshold value.

* * * * *